March 3, 1959 — R. M. KENDIG — 2,876,045
EMERGENCY BRAKING SYSTEM FOR AUTOMOTIVE VEHICLES
Filed Oct. 29, 1956
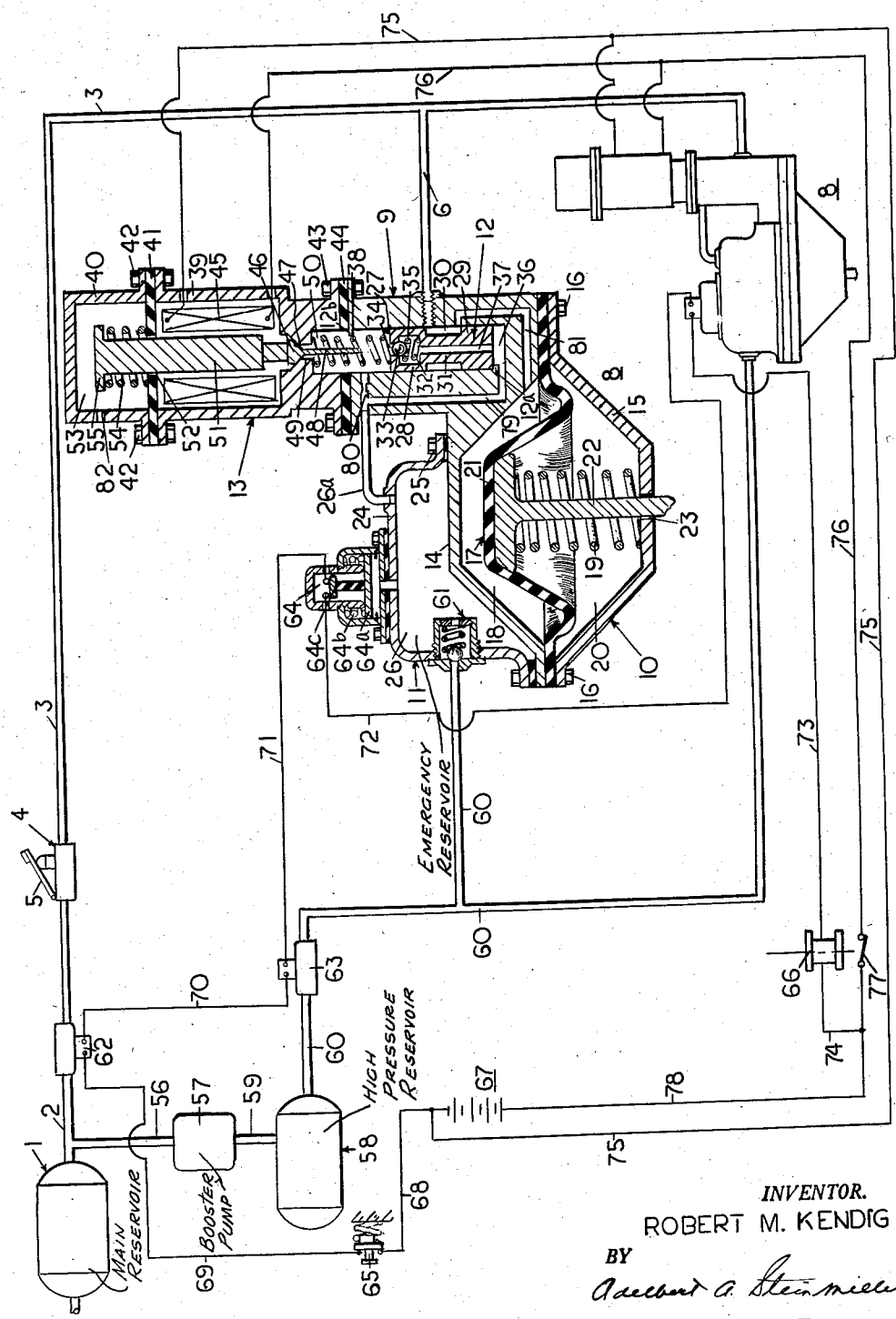
INVENTOR.
ROBERT M. KENDIG
BY
ATTORNEY

United States Patent Office 2,876,045
Patented Mar. 3, 1959

2,876,045

EMERGENCY BRAKING SYSTEM FOR AUTOMOTIVE VEHICLES

Robert M. Kendig, Trafford, Pa., assignor to Westinghouse Air Brake Company, Wilmerding, Pa., a corporation of Pennsylvania Application October 29, 1956, Serial No. 618,819

6 Claims. (Cl. 303—63)

This invention relates to brake control apparatus, and more particularly to automotive brake control apparatus of the type employed on large trucks, truck-trailers or similar vehicles.

In operation of large trucks and especially those that are transporting heavy loads, it has often been impossible to effect emergency braking due to insufficient fluid pressure forces available to adequately apply the brakes when necessary. This insufficiency of fluid pressure forces may be due to leakage in the system or to compressor failure, or possibly the normal fluid pressure carried in the system is not sufficient to stop the heavily laden vehicle under emergency conditions.

It is the principal object of the invention to provide an inexpensive fluid pressure brake system for automotive vehicles including an emergency braking arrangement wherein a source of high pressure is automatically effective or optionally available at the will of the operator to supply fluid at a high pressure to apply the brakes in emergency, as distinct from the normal fluid pressure used for brake applications other than emergency applications.

It is another object of this invention to provide a fluid pressure brake apparatus including a source of a high pressure utilizable in emergency situations, such apparatus being of simple construction and low installation cost.

Another object is to provide an improved fluid pressure brake apparatus for automotive vehicles which provides a source of high fluid pressure in addition to the regular fluid pressure source, and automatic means for causing fluid from said high pressure source to be supplied to the braking means to apply the brakes in emergency situations such as when the pressure in the regular fluid pressure source reduces below a safe value.

Still another object is to provide an emergency fluid brake apparatus of the character indicated in the foregoing objects and further characterized by a novel brake cylinder device having combined in one compact structure therewith a high pressure reservoir utilizable in emergency situations for brake applications and an electrically controlled valve means for controlling supply of fluid under pressure to said brake cylinder.

These objects and other objects and advantages will become apparent from the following detailed description of the invention and from the accompanying drawing, in which the single figure shows, partly in outline and partly in enlarged section, the improved fluid pressure brake system.

Description

As shown in the drawing, the brake system comprises the usual main reservoir 1 for supplying fluid under pressure via a main reservoir pipe 2 to the brake cylinder pipe 3 under the control of the usual brake valve device 4 operable as by a pedal 5. The brake cylinder pipe 3 is connected by branch pipes 6 to a brake controlling device 8 for the wheels of each axle or for each wheel of the vehicle (as desired), two of which are shown on the drawing.

The brake controlling device 8 comprises a brake cylinder 10, an emergency reservoir 11, an intercepting valve device 9 and a solenoid valve device 13.

The brake cylinder 10 consists of a main body casing 14 and an outer casing 15 secured together by a plurality of bolts 16 to house a diaphragm piston 17 subject to fluid under pressure in a chamber 18 on one side and to the biasing force of a spring 19 in a non-pressure chamber 20 on the opposite side. The diaphragm piston 17 comprises a flexible diaphragm 21 and an integral follower and push rod 22 extending through an atmospheric opening 23 in the casing 15 for operating brake shoes (not shown) through mechanical linkage (not shown).

The emergency reservoir 11 comprises a casing 24 suitably secured to the main body casing 14 by bolts 16 and 25 to form a chamber 26.

The intercepting valve device 9 comprises a valve element 12 which is slidable in a bore 27 in the main body casing 14 and is constructed in a spool shape having lands 28 and 29 at the outer extremities such that a chamber 30 is formed by said bore 27 between said lands about a reduced diameter connecting portion 31. The upper land 28 is hollow in structure to form a chamber 32 within said land in which a ball check valve 33 is held against a port 34 in said land 28 by a spring 35. At the outer face of the lower land 29 within bore 27 is a chamber 36, said chamber 36 being connected to chamber 32 within the upper land 28 by a passage 37 extending through the connecting portion 31. A spring 38 is utilized to bias the valve element 12 downward in the bore 27 against a suitable stop 12a.

The solenoid valve device 13 comprises two body portions 39 and 40 joined together at a separating plate 41 by bolts 42, two of which are shown. The lower body portion 39 is secured to the main body casing 14 by bolts 43 and a gasket 44. Housed within the lower body portion 39 are the solenoid winding 45 and a solenoid operated valve 46 and a valve seat 47. A plunger 48 attached to said valve 46 extends through a port 49 in said body portion 39 into a chamber 50 formed by said bore 27 and said body portion 39. A valve stem 51 of the valve 46 extends upward through the winding 45 and a port 52 in the plate 41 into a non-pressure chamber 53 formed by the upper body portion 40. A spring 54 is located between the plate 41 and a shoulder 55 on the stem 51 to bias the stem 51 upward and thereby unseat the valve 46 from the valve seat 47. The winding 45 is wound in such a direction as to bias the stem 51 downward when energized and thereby seat the valve 46 on the valve seat 47.

A branch pipe 56 establishes communication between the main reservoir pipe 2 and a booster pump 57 which in turn is connected to a high pressure reservoir 58 by a pipe 59. The high pressure reservoir 58 is connected to the emergency reservoir 11 on each brake controlling device 8 by a pipe 60 and a suitably constructed ball check valve 61 such that fluid under pressure in the high pressure reservoir 58 may flow only from said high pressure reservoir to said emergency reservoir 11 and not vice versa.

The main reservoir pipe 2, pipe 60, and the emergency reservoir 11 on each brake controlling device 8 are respectively provided with electrically connected fluid pressure operated switches 62, 63 (shown in outline) and 64 (shown in sectional detail), operably responsive to respective fluid pressures therein. These pressure operated switches are of the well-known type having a piston 64a subject to a fluid pressure in opposition to the force of a biasing spring 64b to close a contact 64c. The switches 62, 63 and 64 collectively with a suitable manually operated switch 65 located in the vehicle cab for convenient access by the operator, and a relay 66 are connected electrically to form a series circuit which may be traced from a source of supply such as a battery 67 via wire 68, manually operated switch 65, wire 69, pressure switch 62, wire 70, pressure switch 63, wire 71, pressure switch 64, wire 72 in a series connection to all other pressure switches 64 on each of the brake controlling devices 8, wire 73, the winding of relay 66, wire 74 and wire 78 to the battery 67.

A circuit for energizing the solenoid winding 45 may be traced from the battery 67 via wire 75 in parallel through the winding 45 on each of the brake control devices 8, wire 76, a contact 77 of relay 66 (in closed position with the winding of relay 66 energized) and wire 78 to the battery 67.

*Operation*

In operation, a motor-driven compressor (not shown) on the vehicle supplies fluid under pressure to the main reservoir 1 and main reservoir pipe 2 at a normal fluid pressure as for example 80 p. s. i. This normal fluid pressure under the control of the brake valve device 4 is supplied to the brake cylinder pipe 3 and thence to the brake controlling devices 8 when a brake application is desired, as will be explained hereinafter.

Fluid under normal pressure from the main reservoir pipe 2 is also supplied to the booster pump 57 by pipe 56, where the pressure is increased to a high pressure of for example 100 p. s. i. and then delivered to the high pressure reservoir 58 via pipe 59. The fluid under high pressure is delivered via pipe 60 past ball check valve 61 to the emergency reservoir 11 on each of the brake controlling devices 8 to maintain the chamber 26 of said emergency reservoir 11 charged with fluid under the high pressure of 100 p. s. i. previously mentioned.

The pressure switch 62 is constructed similarly to switch 64, to remain closed only as long as the fluid pressure in the main reservoir pipe 2 is maintained above a predetermined pressure of for example 70 p. s. i. The pressure switches 63 and 64 are similarly constructed such as to remain closed only as long as the fluid pressure in pipe 60 and chamber 26 of the emergency reservoir 11 remains above a predetermined pressure of for example 90 p. s. i. From the above, it can be seen that as long as there is no decrease of for example as cited, 10 p. s. i. below the normal fluid pressures in the pipes 2 and/or emergency reservoir 11, the pressure switches remain closed to cooperate with the normally closed manual switch 65 to complete a previously described series circuit for energizing the winding of relay 66 and thereby maintain the relay 66 picked up and the contact 77 thereof in a closed position. With the contact 77 of relay 66 closed, the previously described circuit for energizing the solenoid windings 45 of the solenoid valve device 13 is completed, thereby maintaining the solenoid operated valve 46 seated on the valve seat 47.

With the solenoid valve winding 45 energized and the valve 46 seated as explained, the fluid under high pressure in chamber 26 of the emergency reservoir is permitted to flow via a pipe 26a and a passage 79 in the main body casing 14, which passage 79 is connected to chamber 36 on the lower side of the valve element 12, and via a choke 80 to chamber 50 on the upper side of the valve element 12 such that an equalization of the fluid pressures in the two chambers 36 and 50 occurs to permit the spring 38 to position the intercepting valve in a lowermost position in the bore 27 against a suitable stop 12a shown in the drawing. With the intercepting valve 12 in its lowermost position as shown, communication is established between chamber 18 of the brake cylinder 10 and the brake cylinder branch pipe 6 by way of a passage 81 in the main body casing 14 and chamber 30 in the bore 27 about the reduced diameter portion 31 of the intercepting valve 12.

A running or brake release position of the pedal 5 of the brake valve 4 is defined when the pedal 5 is in its uppermost position, in which position the brake cylinder pipe 3 and connected branch pipes 6 and hence chamber 18 of each of the brake cylinders 10 is connected to atmosphere through usual ports and passages (not shown) in the brake valve 4.

To make a brake application, the brake pedal 5 is depressed by the operator an amount proportionate to the degree of braking desired, thereby conditioning the brake valve 4 to permit a corresponding amount of flow of fluid under pressure from the main reservoir 1 and main reservoir pipe 2 through passages (not shown) in the brake valve to the brake cylinder pipe 3, branch pipes 6, chamber 30 in the bore 27 of the main valve casing 14, and passage 81 to chamber 18 of the brake cylinder 10. Fluid under pressure in chamber 18 of the brake cylinder 10 acts to overcome the pressure of the spring 19 in the non-pressure chamber 20 and thereby move the diaphragm 21 and push rod 22 downward an amount corresponding to the degree of fluid under pressure in chamber 18, into an application position to apply the brake shoes (not shown). Further depression of the pedal 5 effects an increase in the degree of fluid under pressure delivered to chamber 18 and thereby effects an increase in the degree of brake application. A maximum brake application is attained when the pedal 5 is fully depressed such that full main reservoir fluid pressure (as for example 80 p. s. i. as previously stated) is delivered to the chamber 18 of the brake cylinder 10.

An emergency high pressure brake application may be instigated either manually by operation of the switch 65 to an open position or automatically upon an undesired decrease in fluid pressure in the main reservoir pipe 2, or the pipe 60, or any of the emergency reservoirs 11, sufficient in degree to cause one or all of the pressure switches 62, 63 and 64 to open. Manual opening of switch 65 or opening of any of the pressure switches 62, 63 and 64 breaks the continuity of the circuit previously described for energizing the winding of relay 66 to thereby deenergize relay 66 to cause the contact 77 thereof to open. With contact 77 of relay 66 opened, the circuit for energizing the windings 45 of the solenoid valves 13 is open to effect deenergization of the windings 45 of the solenoid valve. Deenergization of the windings 45 of the solenoid valves 13 permits the spring 54 in chamber 53 to expand against the shoulder 55 on the stem and move the stem 51 upward to unseat the valve 46 from the valve seat 47 and thereby vent chamber 50 to atmosphere via port 49 past the valve seat 47, past the winding 45, through port 52, into chamber 53 and thence to atmosphere via a port 82. The rate of venting of chamber 50 is faster than the rate of flow of fluid under pressure into said chamber via choke 80 thereby effecting a rapid decrease in the pressure of fluid in chamber 50 such that the pressure of fluid in chamber 36 below the valve element 12 effects a snapping movement of said valve to an uppermost position against a suitable stop 12b. With the valve element 12 in its uppermost position, the upper land 28 prevents supply of fluid under pressure to chamber 50 via choke 80, communication between pipe 6 and passage 81 is closed off by the lower land 29 and communication is established between the chamber 26 of the emergency reservoir 11 and the chamber 18 of the brake cylinder 10 via pipe 26a, passage 79, chamber 36 below the valve element and passage 81, thereby establishing a high fluid pressure in chamber 18 of the brake cylinder to effect a brake application by a high pressure through the medium of the push rod 22 and connected mechanical linkage (not shown).

To release the brakes after an emergency brake application just described, the circuit for energizing the winding of relay 66 must be restored either by closing the switch 65 (assuming it has been opened manually) or by recharging the brake equipment to the required fluid pressures (previously described) such that the pressure switches 62, 63 or 64 are closed. In some instances both of the above requirements must be met depending on the circumstances that initiated the emergency application. If the emergency application was initiated by faulty circuitry, the fault must be repaired such that the circuitry is intact before a brake release may be accomplished.

With the circuit for energizing the winding relay 66 completed, the contact 77 thereof is closed to complete the circuit for energizing the windings 45 of the solenoid valve 13 thereby causing the valve 46 to be closed against the valve seat 47. Closing the valve 46 prevents venting of chamber 50 to atmosphere and simultaneously, downward movement of the valve 46 to its closed position causes the plunger 48 attached thereto to pass through the port 34 in the upper land 28 of the intercepting valve 12 when said intercepting valve is in its uppermost position as is the situation due to an emergency application. The plunger 48 when passing through port 34, unseats the ball check valve 33 in opposition to the force exerted by spring 35, thereby permitting the fluid pressure in chamber 36 below the intercepting valve to flow through passage 37 within the intercepting valve to chamber 50 above the intercepting valve to allow equalization of the fluid pressure above and below the intercepting valve. Equalization of the fluid pressures across the intercepting valve permits the spring 38 to position said valve in its lowermost position in which position communication between the chamber 26 of the emergency reservoir 11 and chamber 18 of the brake cylinder 10 is disestablished and communication between the chamber 18 of brake cylinder and pipe 6 is restored. If the brake pedal 5 is in the release or running position (not depressed), the fluid pressure in chamber 18 of the brake cylinder 10 will be vented to atmosphere via passage 81, chamber 30, pipe 6, brake cylinder pipe 3, and an atmospheric port (not shown) in the brake valve 4. If the brake pedal 5 is in a brake application position (depressed), the pressure of fluid in chamber 18 of the brake cylinder 10 will be reduced via the brake valve as just described until the pressure of fluid in chamber 18 is that desired as determined by the degree of depression of the brake pedal 5 at which time the brakes will be lapped by components (not shown) in the usual brake valve 4.

*Summary*

It can thus be seen that the invention provides a brake equipment including a novel brake controlling valve, wherein a normal brake application may be initiated and released under the control of a usual brake valve, and a high pressure emergency brake application is automatically initiated by an unsafe loss of fluid pressure in the brake equipment or by operation of a manual switch. A brake release after emergency application can be made only when the brake equipment is charged with fluid under a predetermined pressure and a manual switch is closed, at which time the emergency application is released and a normal application may be maintained or a complete brake release obtained depending on the position of a brake pedal on a brake valve.

Having now described the invention, what I claim as new and desire to secure by Letters Patent, is:

1. A vehicle fluid pressure braking system comprising a first reservoir charged with fluid at a certain normal pressure, a second reservoir charged with fluid at a pressure substantially higher than the pressure of fluid in said first reservoir, a brake cylinder, a conduit connecting said first reservoir to said brake cylinder, operator controlled valve means controlling the supply of fluid under pressure to the brake cylinder from said first reservoir through said conduit to effect a brake application and controlling the release of fluid under pressure from the brake cylinder to effect a brake release, interceptor valve means interposed in said conduit between said operator controlled valve means and the brake cylinder operable from one position in which it establishes communication through said conduit from the operator controlled valve means to the brake cylinder to a second position in which it prevents the supply of fluid under pressure from said first reservoir to the brake cylinder and connects said second reservoir to the brake cylinder to effect an emergency brake application, electrical means effective when energized to cause said interceptor valve means to be in its said one position and effective upon deenergization thereof to cause operation of said interceptor valve means to its said second position, and pressure switch means operative responsively to reduction of pressure of fluid in said second reservoir below a certain value for effecting deenergization of said electrical means.

2. A vehicle fluid pressure braking system comprising a first reservoir charged with fluid at a certain normal pressure, a second reservoir charged with fluid at a pressure substantially higher than the pressure of fluid in said first reservoir, a brake cylinder, a conduit connecting said first reservoir to said brake cylinder, operator controlled valve means controlling the supply of fluid under pressure to the brake cylinder from said first reservoir through said conduit to effect a brake application and controlling the release of fluid under pressure from the brake cylinder to effect a brake release, interceptor valve means interposed in said conduit between said operator controlled valve means and the brake cylinder operable from one position in which it establishes communication through said conduit from the operator controlled valve means to the brake cylinder to a second position in which it prevents the supply of fluid under pressure from said first reservoir to the brake cylinder and connects said second reservoir to the brake cylinder to effect an emergency brake application, electrical means effective when energized to cause said interceptor valve means to be in its said one position and effective upon deenergization thereof to cause operation of said interceptor valve means to its said second position, first pressure switch means operative responsively to reduction of pressure of fluid in said first reservoir below a certain value for effecting deenergization of said electrical means, and second pressure switch means operative responsively to reduction of pressure of fluid in said second reservoir below a certain value for also effecting deenergization of said electrical means.

3. A vehicle fluid pressure braking system comprising a first reservoir charged with fluid at a certain normal pressure, a second reservoir charged with fluid at a pressure substantially higher than the pressure of fluid in said first reservoir, a brake cylinder, a conduit connecting said first reservoir to said brake cylinder, operator controlled valve means controlling the supply of fluid under pressure through said conduit to the brake cylinder from said first reservoir to effect a brake application and controlling the release of fluid under pressure from the brake cylinder to effect a brake release, interceptor valve means interposed in said conduit between said operator controlled valve means and the brake cylinder operable to prevent the supply of fluid under pressure from said first reservoir to the brake cylinder and to connect said second reservoir to the brake cylinder to effect an emergency brake application, normally energized solenoid means operable upon deenergization thereof to control operation of said interceptor valve means, current-responsive relay means operable when energized to maintain said solenoid means energized and operable when deenergized to effect deenergization of said solenoid means, circuit means operable when interrupted to effect deenergization of said relay means, and pressure switch means operative responsively to a reduction of pressures of fluid in said first and second reservoirs below different values respectively for effecting interruption of said circuit means.

4. A vehicle fluid pressure braking system comprising a first reservoir charged with fluid at a certain normal pressure, a second reservoir charged with fluid at a pressure substantially higher than the pressure of fluid in said first reservoir, a brake cylinder device comprising two casing parts and a diaphragm piston secured therebetween, one of said casing parts having formed therein at one side of said diaphragm piston a brake cylinder chamber and also forming separate from the brake cylinder chamber an emergency reservoir, first conduit means connecting said second reservoir to said emergency reservoir, one-way valve means preventing back flow of fluid under pressure from said emergency reservoir to said second reservoir, a second conduit connecting said first reservoir to said brake cylinder, operator controlled valve means controlling the supply of fluid under pressure through said second conduit to the brake cylinder chamber from said first reservoir to effect a brake application and controlling the release of fluid under pressure from the brake cylinder chamber to effect a brake release, and interceptor valve means interposed in said second conduit between said operator controlled valve means and the brake cylinder chamber operable to prevent the supply of fluid under pressure from said first reservoir to the brake cylinder chamber and to connect said emergency reservoir to the brake cylinder chamber to effect an emergency brake application.

5. A vehicle fluid pressure braking system comprising a first reservoir charged with fluid at a certain normal pressure, a second reservoir charged with fluid at a pressure substantially higher than the pressure of fluid in said first reservoir, a brake cylinder device comprising two casing parts and a diaphragm piston secured therebetween, one of said casing parts having formed therein at one side of said diaphragm piston a brake cylinder chamber and also forming separate from the brake cylinder chamber an emergency reservoir, first conduit means connecting said second reservoir to said emergency reservoir, one-way valve means preventing back flow of fluid under pressure from said emergency reservoir to said second reservoir, a second conduit connecting said first reservoir to said brake cylinder chamber, operator controlled valve means controlling supply of fluid under pressure through said second conduit to the brake cylinder chamber from said first reservoir to effect a brake application and controlling release of fluid under pressure from the brake cylinder chamber to effect a brake release, interceptor valve means interposed in said second conduit between said operator controlled valve means and the brake cylinder operable from one position in which it establishes communication through said second conduit from the operator controlled valve means to the brake cylinder to a second position in which it prevents the supply of fluid under pressure from said first reservoir to the brake cylinder and connects said emergency reservoir to the brake cylinder to effect an emergency brake application, electrical means effective when energized to cause said interceptor valve means to be in its said one position and effective upon deenergization thereof to cause operation of said interceptor valve means to its said second position, first pressure switch means responsive to reduction of pressure of fluid in said first reservoir below a first certain value for effecting deenergization of said electrical means, second pressure switch means responsive to a reduction of pressure of fluid in said second reservoir below a second certain value for effecting deenergization of said electrical means, and third pressure switch means responsive to reduction of pressure of fluid in said emergency reservoir below said second certain value for effecting deenergization of said electrical means.

6. The combination with a fluid pressure brake system having a main reservoir supplied with fluid under normal brake operating pressure, a main reservoir pipe, a fluid pressure brake actuating device and a brake valve device for establishing and regulating a communication for flow of fluid under pressure between said main reservoir and said fluid pressure brake actuating device, of a high pressure reservoir, supply means for supplying fluid under pressure greater than said normal brake operating pressure to said high pressure reservoir, emergency reservoir means integrally attached to said brake actuating device, conduit means connecting said high pressure reservoir to said emergency reservoir means, controlling valve means operable in one position to establish a first communication between said brake valve device and said brake actuating device and operable in a second position to disestablish said first communication and establish a second communication between said emergency reservoir means and said brake actuating device, solenoid operated valve means operative upon energization to effect positioning of said controlling valve means in said one position and operative upon deenergization to effect positioning of said controlling valve means in said second position, circuit means controlling said solenoid operated valve means, and pressure switch means operative responsively to fluid pressure in said main reservoir pipe, said delivery pipe and said emergency reservoir means for controlling said circuit means.

References Cited in the file of this patent
UNITED STATES PATENTS

| | | |
|---|---|---|
| 2,680,500 | Jenkins | June 8, 1954 |
| 2,738,037 | Balcerek et al. | Mar. 13, 1956 |
| 2,781,870 | Clements | Feb. 19, 1957 |